UNITED STATES PATENT OFFICE 2,211,984

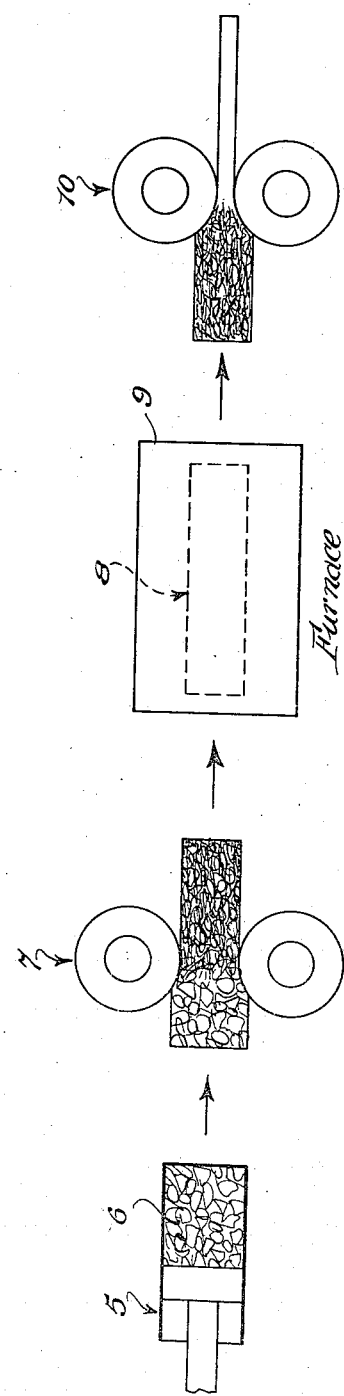

METHOD OF PRODUCING BILLETS FROM STEEL SCRAP

Alexander Paterson, Buffalo, N. Y.

Application October 1, 1938, Serial No. 232,891

3 Claims. (Cl. 29—160.5)

In the treatment of steel scrap for the preparation of billets for hot rolling two practices have heretofore been usual. One practice has been to melt the scrap in an open hearth furnace and then roll it into steel billets. Another practice has been to form a bale in which the scrap is placed between iron slabs and to heat the bale to a temperature at which the scrap is a spongy plastic mass, the bale then being rolled as a billet into a merchant bar or the like. Both of these practices involve the use of costly installations and the loss of heat by radiation as a factor to be overcome in the rolling of the scrap into billets.

This invention relates to an improved method for forming billets from steel scrap and its objects are to eliminate the use of the costly installations heretofore necessary, to eliminate all problems arising from heat treatment and the loss of heat by radiation, and to produce billets from scrap by extremely simple and economical procedure.

For the accomplishment of these objects the invention proposes a method for the cold treatment of scrap to reduce it to billets suitable for hot or finish rolling into merchant bars. The method is of particular value in the utilization of sheet scrap such as is obtained from automobile bodies and fenders.

The single figure of the drawing illustrates diagrammatically apparatus suitable for carrying out the method.

The method is characterized by the preliminary cold reduction of the scrap into the form of a bale of suitable density and dimensions and the cold rolling of the bale in passes of any suitable number and form into billets which may later be hot rolled to a finished bar or section.

The preliminary reduction of the scrap into the form of a suitable bale (resembling an ingot) is preferably effected by a suitable press 5, i. e. mechanical or hydraulic. By the action of such a press the scrap is reduced to a stable density, that is to say a density of the order of 40% of that of solid steel, and is formed into a bale 6 suitable as to shape and dimensions for the subsequent cold rolling treatment. The bales to be cold rolled into billets may, of course, be made of any suitable shape, i. e., dimensions, for example, ten or twelve inches square and of any desired length. The density to which the scrap is reduced by the press is such that the resultant ingot-like bale will be amply stable for effective cold rolling into the form of billets or slabs.

The bales resultant from the preliminary reduction of the scrap, and having the above described characteristics, are then reduced cold in a rolling mill 7 of any suitable construction for the purpose in view and in passes of any suitable number and form to a suitable billet section 8 which may later be heated in a furnace 9 and rolled in a mill 10 into merchant bars. Instead of a billet section the bales may similarly be reduced to slabs for flat rolling. A great advantage of cold rolling the compressed bale is the fact that the bales can follow each other in continuous sequence through the reducing passes, thus approximating the efficiency of continuous mills. Another valuable advantage is that the factor of the loss of heat by radiation is eliminated.

The cold rolling mill concentrates its power of compression at any moment upon a surface of the bale which is a small fraction of its total surface which was acted upon in the press and in this way produces a billet or slab of much greater density than can be attained in the formation of the bale by the press.

The cold rolling of the bales substantially increases the density of the scrap and produces billets suitable in form and character for hot finish rolling into merchant bars and which may have a density as high as the order of 80% of the density of solid steel, such density insuring requisite stability of form during the heating for hot rolling, and the billets so characterized being useful for the production of articles which do not require engineering specifications, e. g. nuts, bolts, forming steels, toys, table legs, and the like.

I claim as my invention:

1. The method of producing billets from pieces of steel scrap which consists in effecting a preliminary reduction of the scrap at substantially ambient temperature to the form of an ingot-like bale, the bale having a density of the order of 40% of the density of solid steel, such density being sufficient to form a self-sustaining mass and to insure stability in the subsequent rolling of the bale, and then rolling the bale at substantially ambient temperature, with resultant substantial increase of the density of the bale, into a billet of suitable form and density for hot finish rolling in the production of articles of steel which do not require engineering specifications.

2. The method of producing billets from pieces of steel scrap which consists in compressing the scrap at substantially ambient temperature to effect the preliminary reduction thereof to the form of an ingot-like bale, the bale having a density of the order of 40% of the density of solid steel, such density being sufficient to form a self-sustaining mass and to insure stability in the subsequent rolling of the bale, and then rolling the bale at substantially ambient temperature, with resultant substantial increase of the density of the bale, into a billet of suitable form and density for hot finish rolling in the production of articles of steel which do not require engineering specifications.

3. The method of producing billets from pieces of steel scrap and forming the billets into articles of steel which do not require engineering specifications, which method consists in compressing the scrap at substantially ambient temperature to effect the preliminary reduction thereof to the form of an ingot-like bale, the bale having a density of the order of 40% of the density of solid steel, such density being sufficient to form a self-sustaining mass and to insure stability in the subsequent rolling of the bale, rolling the bale at substantially ambient temperature, with resultant increase in its density, into a billet, and then hot rolling the billet to a finished section.

ALEXANDER PATERSON.